US010679010B2

(12) United States Patent
Sundaram Murugeshan et al.

(10) Patent No.: US 10,679,010 B2
(45) Date of Patent: Jun. 9, 2020

(54) METHOD AND SYSTEM OF GENERATING DIALOGUE RESPONSES FOR USERS IN REAL-TIME

(71) Applicant: WIPRO LIMITED, Bangalore (IN)

(72) Inventors: Meenakshi Sundaram Murugeshan, Bangalore (IN); Balaji Jagan, Bangalore (IN)

(73) Assignee: Wipro Limited, Bangalore (IN)

( * ) Notice: Subject to any disclaimer, the term of this patent is extended or adjusted under 35 U.S.C. 154(b) by 215 days.

(21) Appl. No.: 15/988,493

(22) Filed: May 24, 2018

(65) Prior Publication Data
US 2019/0303439 A1    Oct. 3, 2019

(30) Foreign Application Priority Data

Mar. 28, 2018 (IN) .............................. 201841011536

(51) Int. Cl.
*G06F 17/27* (2006.01)
*G06F 40/30* (2020.01)
*G06N 20/00* (2019.01)

(52) U.S. Cl.
CPC ............. *G06F 40/30* (2020.01); *G06N 20/00* (2019.01)

(58) Field of Classification Search
None
See application file for complete search history.

(56) References Cited

U.S. PATENT DOCUMENTS

| 9,594,745 B2 | 3/2017 | Jackson | |
| 2011/0119047 A1 | 5/2011 | Ylonen | |
| 2011/0231448 A1* | 9/2011 | Cai | G06F 16/951 |
| | | | 707/792 |
| 2015/0256675 A1* | 9/2015 | Sri | H04L 51/32 |
| | | | 379/265.09 |
| 2017/0371861 A1 | 12/2017 | Barborak | |
| 2018/0032884 A1* | 2/2018 | Murugeshan | G06N 5/04 |
| 2018/0365228 A1* | 12/2018 | Galitsky | G06F 40/205 |

OTHER PUBLICATIONS

Kozlowski, R., et al., "Selectional restrictions in natural language sentence generation", ResearchGate, (2002), 6 pages.

* cited by examiner

*Primary Examiner* — Satwant K Singh
(74) *Attorney, Agent, or Firm* — Finnegan, Henderson, Farabow, Garrett & Dunner, LLP (57) ABSTRACT

The present disclosure discloses method and response generation system for generating dialogue responses for users in real-time. The response generation system receives pair of utterance from one or more sources, where pair of utterance comprise conversation between user and computing device, identifies one or more labels from utterance of pair of utterance that corresponds to user, where one or more labels exhibit relationship. One or more intent corresponding to each of identified one or more labels is determined, where one or more intent is restricted according to current context of utterance of user. A polarity of each of one or more intent is determined based on pre-defined scale comprising left bound and right bound and one or more responses for user are generated until determined polarity for each of labels from identified one or more labels is within pre-defined distance of left bound or right bound of pre-defined scale.

20 Claims, 6 Drawing Sheets

METHOD AND SYSTEM OF GENERATING DIALOGUE RESPONSES FOR USERS IN REAL-TIME

TECHNICAL FIELD

The present subject matter is related in general to field of virtual assistance, more particularly, but not exclusively to method and system for generating dialogue responses for users in real-time.

BACKGROUND

Today, conversation dialog systems are used for a variety of different applications. For example, conversation dialog systems have been developed to allow users to search for content, buy items, obtain directions, report issues, resolve the reported issues interactively, and the like. To perform the above stated, it is imperative for such systems to generate responses that are most relevant to the context of an ongoing conversation, in order to take the conversation to a logical conclusion.

Often, in conversation dialog systems, the users provide utterances which involves complex sentences. Typically, conversations involving utterances with complex sentences correspond to multiple dialog acts which include one or more user utterances and corresponding system responses. In a conversation, response sufficiency and relevance play a critical role in driving intent specific conversation. The fundamental goal of any conversation engine is to generate concise responses to user queries and dynamically generate clarification questions in case required, when information is not available. The dialog acts which are utterance chunks conveying "acknowledgement', 'negation', "requesting clarification" and much more, are quite common in any conversation. In many cases, the utterances can fall under multiple dialog acts based on the context of the conversation. For example, an utterance "ok" can act as "acknowledgement" for a clarification question such as, "would you like to go ahead with ticket booking?". Here the question restricts the user to provide a "yes" or a "no" response alone. However, presence of additional keywords may result in different dialog acts such as, the user responses as, "ok, but what is . . . ". In this case, the user does not completely agree with the system response and leads to complex dialog acts Existing systems of dialogue response system generally fail in handling such complex utterances while generating dynamic response to users. Moreover, the existing systems consume more time in completing dialogues, that is more conversation time is taken during interaction. Thus, there is a need for a robust and efficient mechanism to produce desired responses for users.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method of generating dialogue responses for users in real-time. The method comprises receiving a pair of utterance from a dialogue system of a plurality of dialogue systems. The pair of utterance comprise conversation between a user and the dialogue system. The method comprises identifying one or more labels from an utterance of the pair of utterance that corresponds to the user. The one or more labels exhibit a relationship. The method comprises determining one or more intents corresponding to each of the identified one or more labels. The one or more intents are restricted according to a current context of the utterance of the user. The method comprises determining a polarity of each of the determined one or more intents on a pre-defined scale comprising a left bound and a right bound and generating one or more responses for the user until the determined polarity for each of the labels, from the identified one or more labels, bound by the relationship, is within a pre-defined distance of the left bound or the right bound of the pre-defined scale.

In an embodiment, the present disclosure may relate to a response generation system for generating dialogue responses for users in real-time. The response generation system may comprise a processor and a memory communicatively coupled to the processor, where the memory stores processor executable instructions, which, on execution, may cause the response generation system to receive a pair of utterance from a dialogue system of a plurality of dialogue systems. The pair of utterance comprise conversation between a user and the dialogue system. The response generation system identifies one or more labels from an utterance of the pair of utterance that corresponds to the user. The one or more labels exhibit a relationship. The response generation system determines one or more intents corresponding to each of the identified one or more labels. The one or more intents are restricted according to a current context of the utterance of the user. The response generation system determines a polarity of each of the determined one or more intents on a pre-defined scale comprising a left bound and a right bound and generates one or more responses for the user until the determined polarity for each of the labels, from the identified one or more labels, bound by the relationship, is within a pre-defined distance of the left bound or the right bound of the pre-defined scale.

In an embodiment, the present disclosure relates to a non-transitory computer readable medium including instructions for generating dialogue responses for users in real-time stored thereon that when processed by at least one processor may cause a response generation system to receive a pair of utterance from a dialogue system of a plurality of dialogue systems. The pair of utterance comprise conversation between a user and the dialogue system. The instruction causes the processor to identify one or more labels from an utterance of the pair of utterance that corresponds to the user. The one or more labels exhibit a relationship. The instruction causes the processor to determine one or more intents corresponding to each of the identified one or more labels. The one or more intents are restricted according to a current context of the utterance of the user. The instruction causes the processor to determine a polarity of each of the determined one or more intents on a pre-defined scale comprising a left bound and a right bound and generate one or more responses for the user until the determined polarity for each of the labels, from the identified one or more labels, bound by the relationship, is within a pre-defined distance of the left bound or the right bound of the pre-defined scale.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method and a response generation system for generating dialogue responses for users in real-time. In an embodiment, the present disclosure may generate dialogue responses specific to a domain. In an embodiment, the present disclosure may be utilized in a troubleshoot virtual environment. Particularly, when a user faces any issues specific to a domain, the user may interact with a troubleshooting dialogue system associated with the domain to resolve the issues. During the interaction with the dialogue system, the user may provide responses which may not be comprehensible to the dialogue system. In an embodiment, the dialogue system may be designed to converse with the user using a coherent structure and text, speech, graphics, or any other modes of communication. Interaction between the user and the dialogue system may be stored as utterance and provided to the response generation system. The response generation system may analyse the utterance and generate responses for the user in real-time. The present disclosure generates responses for complex utterance in dialogue systems.

Figure 1:
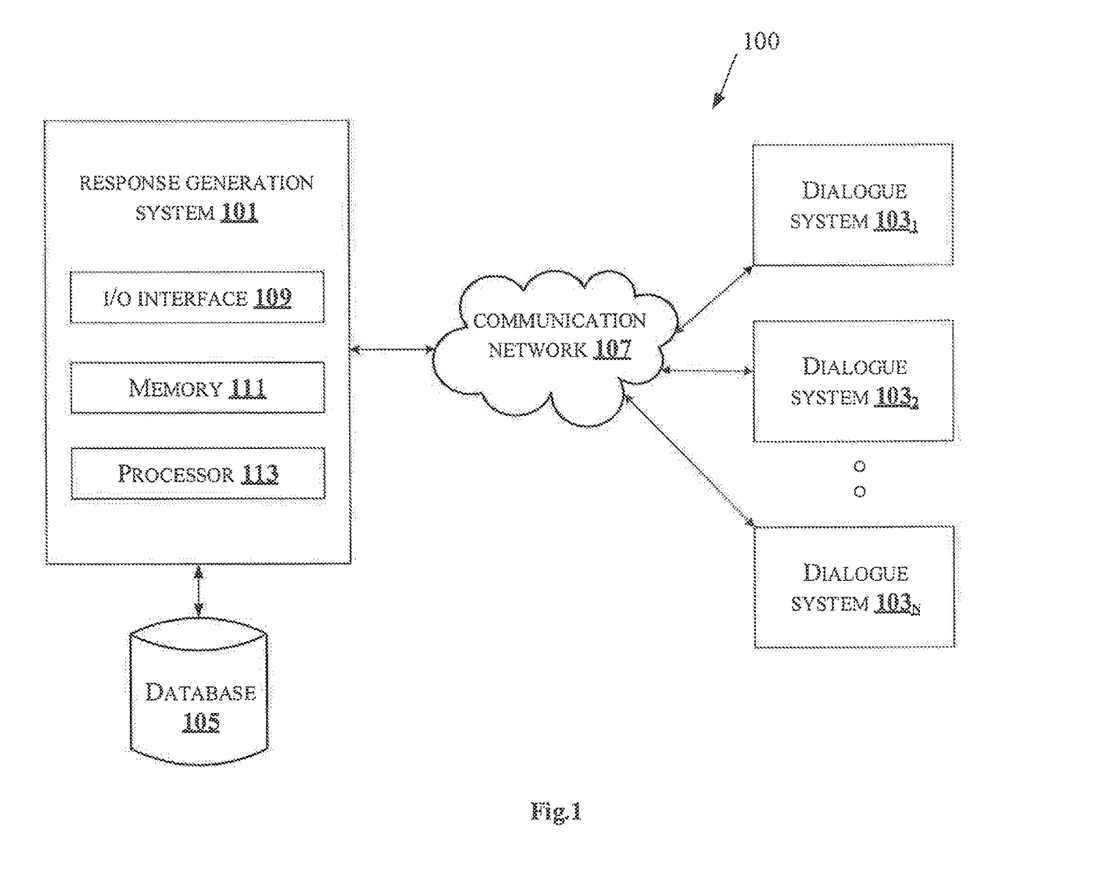
FIG. 1 illustrates an exemplary environment for generating dialogue responses for users in real-time in accordance with some embodiments of the present disclosure.

FIG. 1 illustrates an exemplary environment for generating dialogue responses for users in real-time in accordance with some embodiments of the present disclosure.

As shown in FIG. 1, an environment 100 comprises a response generation system 101 connected through a communication network 107 to a dialogue system 103$_1$, a dialogue system 103$_2$, . . . and a dialogue system 103$_N$ (collectively referred as plurality of dialogue systems 103). The response generation system 101 may be connected to a database 105. In an embodiment, the plurality of dialogue systems 103 may provide personalized assistance to users in a troubleshooting environment. In an embodiment, the plurality of dialogue systems 103 may be an online assistance system or an offline assistance system. In an embodiment, the plurality of dialogue systems 103 may include any computing device, but is not limited to, a laptop, a desktop computer, a Personal Digital Assistant (PDA), a notebook, a smartphone, a tablet, a server, and any other computing devices. A person skilled in the art would understand that, any other dialogue systems for providing user and system utterance, not mentioned explicitly, may also be used in the present disclosure. Further, the communication network 107 may include, but is not limited to, a direct interconnection, an e-commerce network, a Peer to Peer (P2P) network, Local Area Network (LAN), Wide Area Network (WAN), wireless network (e.g., using Wireless Application Protocol), Internet, Wi-Fi and the like. The response generation system 101 generates dialogue responses for users in real-time. In an embodiment, the response generation system 101 may include, but is not limited to, a laptop, a desktop computer, a Personal Digital Assistant (PDA), a notebook, a smartphone, a tablet, a server, and any other computing devices. A person skilled in the art would understand that, any other device, not mentioned explicitly, may also be used as the response generation system 101 in the present disclosure. The response generation system 101 may comprise an I/O interface 109, a memory 111 and a processor 113. At an instant, the response generation system 101 may receive a pair of utterance from one of a dialogue system of the plurality of dialogue systems 103. In an embodiment, the pair of utterance represents a conversation between a user and the dialogue system. Particularly, the pair of utterance may comprise one or more instructions and clarification questions provided by the dialogue system of the plurality dialogue systems 103 and corresponding response provided by the user. For instance, consider a pair of utterance, where a dialogue system utterance is, "Have you pulled out the paper from tray and is the printer working fine?", and corresponding response of the user as, "Printer is working fine". The response generation system 101 may identify one or more labels from an utterance of the pair of utterance which may correspond to the user. In an embodiment, the one or more labels may correspond to a label from a plurality of predetermined labels stored in the database 105. In an embodiment, the one or more labels may exhibit a relationship. In an embodiment, the relationship may comprise a semantic relationship such as, a holonymy relation and a meronymy relation. A person skilled in the art would understand that any other type of semantic relationship, not mentioned explicitly, may also be used in the present disclosure.

In an embodiment, the one or more labels may be identified based on a decision tree, stored in the database 105, which comprises one or more nodes indicative of a label or an expected state of the label. For instance, in the above example of the user utterance, "tray" and "printer" may be identified as the labels. Further, the response generation system 101 may determine one or more intent corresponding to each of the one or more labels. In an embodiment, the one or more intent may be restricted according to a current context of the utterance of the user. In an embodiment, the response generation system 101 may determine the one or more intent by identifying one or more frames from the utterance of the user, where each of the one or more frames correspond to the one or more labels. Further, the response generation system 101 may identify one or more pre-defined frame elements corresponding to each of the one or more frames, where each frame element is pre-annotated with a pre-defined set of frames specific to a domain. Furthermore, the response generation system 101 may determine an expected state information corresponding to each of the one or more frame elements, where the expected state information is indicative of the one or more intents of the user with respect to the one or more labels. In an embodiment, the response generation system 101 may perform the pre-annotation of the one or more frame elements by enriching each frame element of the one or more frame elements based on manual inputs received from the user. Further, the response generation system 101 may determine prominent frame elements by characterizing the domain based on a spectral clustering and a re-ranking of each frame element. Further, the response generation system 101 may determine a polarity of each of the one or more intent on a pre-defined scale, where the pre-defined scale comprises a left bound and a right bound. Thereafter, the response generation system 101 may generate one or more responses for the user when the determined polarity for each of the labels, bound by the relationship, is within a pre-defined distance of the left bound or the right bound of the pre-defined scale. In an embodiment, the left bound is indicative of negative polarity of the expected state of the one or more label, and the right bound is indicative of a positive polarity of the expected state of the one or more labels. In an embodiment, the response for the user comprise one or more clarification questions for the user.

The I/O interface 109 may be configured to receive the pair of utterance from the dialogue system of the plurality of dialogue systems 103. The I/O interface 109 may provide the one or more responses generated for the user to the dialogue system of the plurality of dialogue systems 103.

The information received from the I/O interface 109 may be stored in a memory 111. The memory 111 may be communicatively coupled to the processor 113 of the response management system 101. The memory 111 may also store processor 113 instructions which may cause the processor 113 to execute the instructions for generating dialogue responses for the users in real-time.

Figure 2:
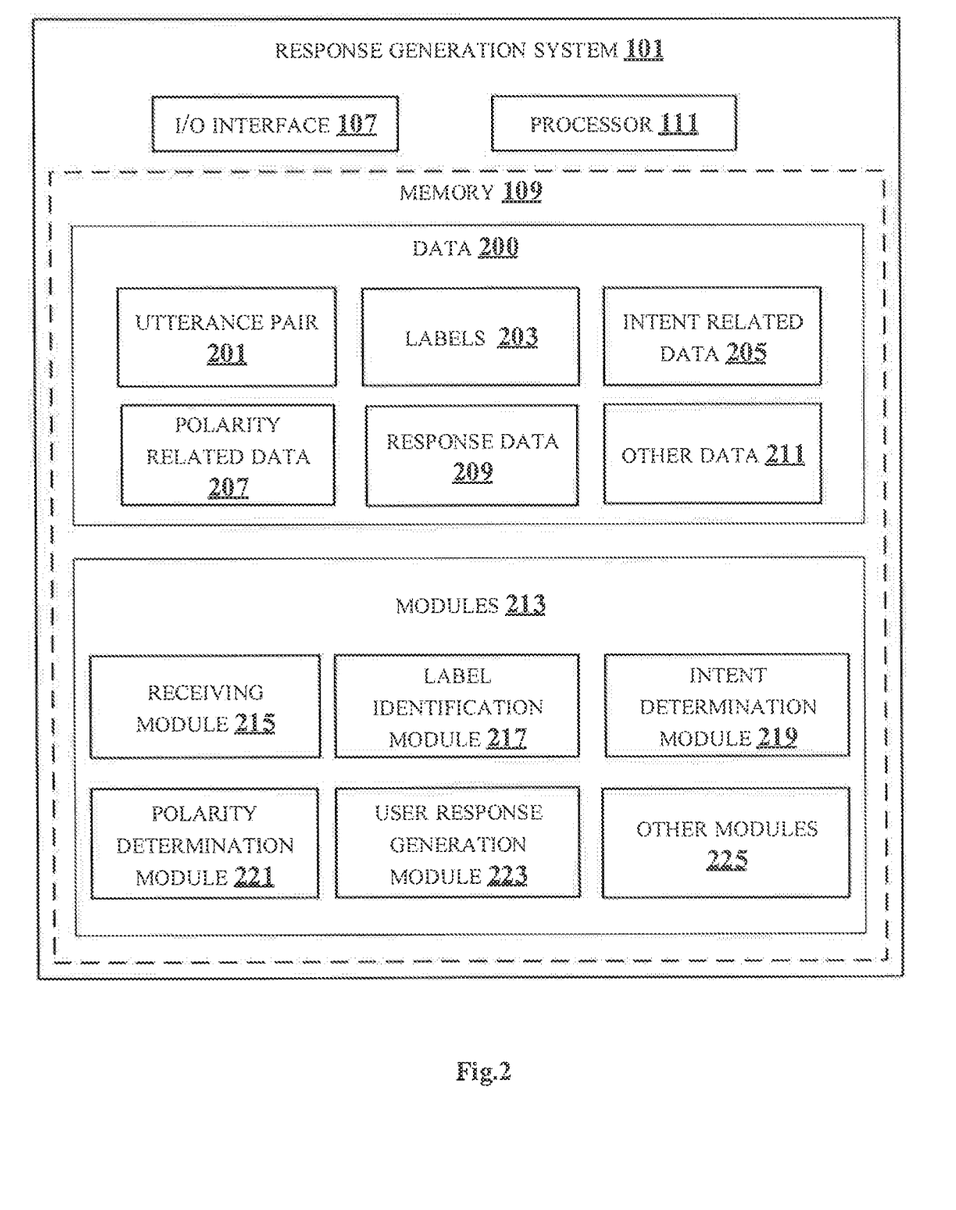
FIG. 2 shows a detailed block diagram of a response generation system in accordance with some embodiments of the present disclosure.

FIG. 2 shows a detailed block diagram of a response generation system in accordance with some embodiments of the present disclosure.

Data 200 and one or more modules 213 of the response generation system 101 are described herein in detail. In an embodiment, the data 200 may include utterance pair data 201, label data 203, intent related data 205, polarity data 207, response data 209 and other data 211.

The utterance pair data 201 may comprise the pair of utterance received from the dialogue system of the plurality of dialogue systems 103. In an embodiment, the pair of utterance represents the conversation between the user and the dialogue system. In an embodiment, the pair of utterance may be split into a response of the dialogue system and the utterance from the user and represented as <system response, user utterance>. In an embodiment, the pair of utterance may comprise one or more instructions and clarification questions from the dialogue system and the corresponding response provided by the user. For example, the utterance pair may comprise the system response as, "have you switched on the device and can you open the tray" and the corresponding user response may be" yes, it's on, but tray is jammed".

The label data 203 may comprise the one or more labels identified from the utterance of the user of the pair of the utterance. The label data 203 may comprise the plurality of predefined labels associated with a domain. Further, the label data 203 may comprise the decision tree which includes the one or more nodes indicative of the label or the expected state of the label. Further, the label data 203 may comprise information about the relationship exhibited by the one or more labels. In an embodiment, the relationship may be the semantic relationship such as, the holonymy relation and meronymy relation. In an embodiment, the holonymy relation refers to "whole-part of" relationship and the meronymy relation refer to "part of-whole" relationship. For example, in the above pair of utterance, "Printer" is the "Holonym" of "Tray". If the user responses as "my printer is fine", then no questions related to sub-parts of printer are trigged. However, presence of the meronymy relation such as, "printer tray", may keep context open for all dependent parts related to the main feature, in this case, the printer.

The intent related data 205 may comprise the one or more intent corresponding to each of the one or more labels. The intent related data 205 may comprise details about the one or more frames identified from the utterance of the user and the pre-defined set of frames associated to a domain. Further, the intent related data 205 may comprise the one or more pre-annotated frame elements associated with the domain and prominent frame elements. For example, in the printer domain, the pre-annotated frame elements may be "hardware symptoms", "error code", "model number" etc. Further, the intent related data 205 may comprise details on the expected state information corresponding to each of the one or more frame elements. In an embodiment, the expected state information may be indicative of the one or more intent of the user with respect to the one or more labels.

The polarity data 207 may comprise information about the polarity of each of the one or more intent on the pre-defined scale. In an embodiment, the pre-defined scale comprises the left bound and the right bound. In an embodiment, the left bound may be indicative of negative polarity of the expected state of the one or more labels and the right bound may be indicative of the positive polarity of the expected state of the one or more labels.

The response data 209 may comprise the one or more responses generated for the user based on the polarity data 207. In an embodiment, the one or more responses for the user may comprise clarification questions for the user.

The other data 211 may store data 200, including temporary data and temporary files, generated by the one or more modules 213 for performing the various functions of the response generation system 101.

In an embodiment, the data 200 in the memory 111 are processed by the one or more modules 213 present within the memory 111 of the response generation system 101. In an embodiment, the one or more modules 213 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The one or more modules 213 when configured with the functionality defined in the present disclosure will result in a novel hardware In one implementation, the one or more modules 213 may include, but are not limited to a receiving module 215, a label identification module 217, an intent determination module 219, a polarity determination module 221 and a user response generation module 223. The one or more modules 213 may also include other modules 225 to perform various miscellaneous functionalities of the response generation system 101. In an embodiment, the other modules 225 may include a label relationship determination module which may determine semantic relationship between the one or more labels.

The receiving module 215 may receive the pair of utterance from the dialogue system of the plurality of dialogue systems 103. In an embodiment, the pair of utterance may comprise the one or more instructions and clarification questions from the dialogue system and corresponding response of the user.

The label identification module 217 may identify the one or more labels from the utterance of the user. The label identification module 217 may identify the one or more labels based on the decision tree defined previously, which comprises the one or more nodes indicating the label or the expected state of the label. The label identification module 217 may identify the one or more labels from the plurality of predetermined labels. For example, consider the system response as, "Have you switched on the device and let me know whether you are able to open the tray, and the user utterance as, "Yes, it's on, but tray is jammed". In this pair utterance, system response comprises two labels namely, the "device" and the "tray". In an embodiment, the decision tree is a type of supervised machine learning which makes use of decision nodes and leaves. Each leaf indicates a possible outcome of the decision. For example, in the above stated user utterance, "Printer state" can be "switch on"/"switch off". Further, the one or more labels identified by the label identification module 217 may exhibit the relationship determined by the label relationship determination module.

Figure 3:
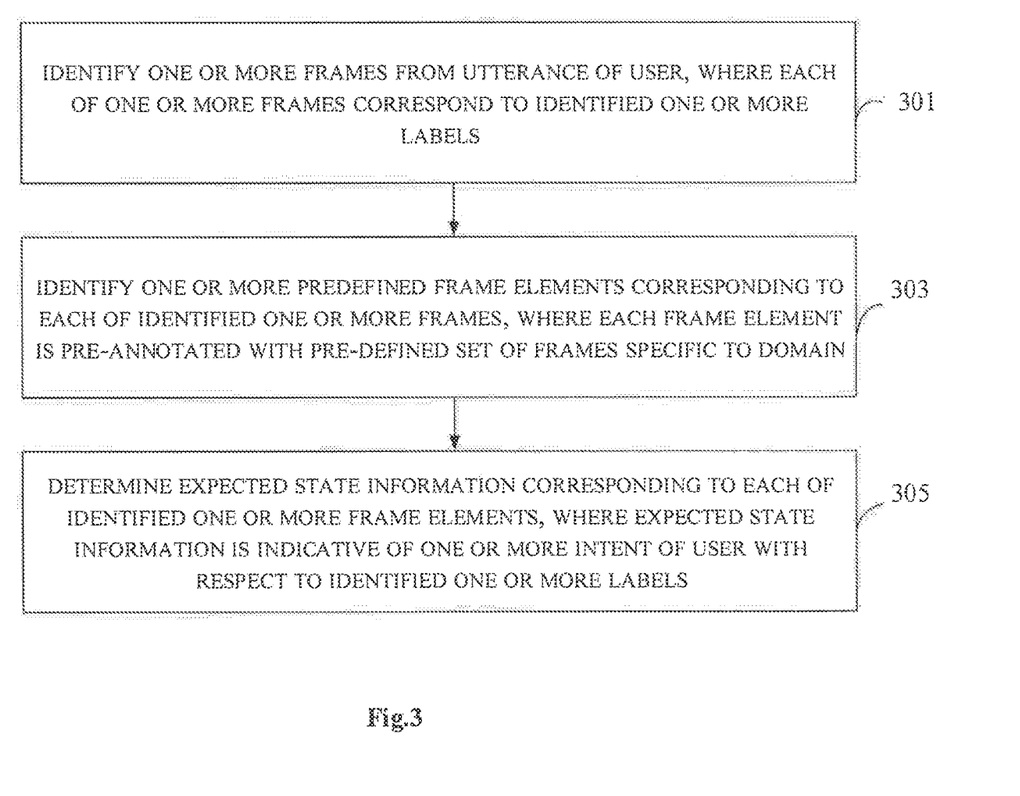
FIG. 3 shows a flowchart for determining intent in accordance with some embodiments of the present disclosure.

The intent determination module 219 may determine the one or more intent corresponding to the one or more labels. In an embodiment, the one or more intent may be determined according to the current context of the utterance of the user. In an embodiment, the intent determination module 219 may use selection restriction technique for determining the one or more intent from the user utterance. The selection restriction technique is an integral part of frame semantics which may refer to constraints imposed on types of arguments in a sentence. A person skilled in the art would understand that any other technique for determining the intent, not mentioned explicitly, may also be used in the present disclosure. FIG. 3 shows a flowchart for determining intent in accordance with some embodiments of the present disclosure.

As shown in FIG. 3, at block 301, the intent determination module 219 may identify the one or more frames corresponding to the one or more labels from the user utterance.

At block 303, the intent determination module 219 may identify the one or more predefined frame elements corresponding to the one or more frames. In an embodiment, the one or more frame elements may be pre-annotated with the predefined set of frames specific to the domain. In an embodiment, the intent determination module 219 may perform the pre-annotation of the one or more frame elements by enriching each frame element of the one or more frame elements based on manual inputs received from the user during a training phase. During the training phase, the user may manually annotate the domain specific manuals and utterance to detect domain specific frame elements. In an embodiment, each of the frame element may be enriched using domain specific dependent polarity such as, "low", "high" etc., which may align with positive or negative sentiment based on the associated intent. Further, the intent determination module 219 may determine the prominent frame elements characterizing the domain based on the spectral clustering and the re-ranking of each frame element. For example, in printing domain, prominent frame elements may be "printer_state", "printer_type", "hardware_symptoms" and the like. For example, "InkJet 215" and "LaserJet 5140" are annotated as "Printer_Model_Number" which is a "domain specific frame element". In an embodiment, when different features belonging to different manufactures are considered, similar frame elements such as "Printer_Model_Number" and "Tray_Type" and the like are detected. In an embodiment, domain specific features may be extracted using Pointwise Mutual Information (PMI) technique or by Log Likelihood (LL) technique. A person skilled in the art would understand that any other technique for extracting domain specific features not mentioned explicitly, may also be used in the present disclosure.

At block 305, the intent determination module 219 may determine the expected state information corresponding to the one or more frame elements, where the expected state information may be indicative of the one or more intent of the user with respect to the one or more labels. In an embodiment, the intent determination module 219 may use frame semantics technique using FrameNet technique and may customize for domain specific conversation. The frame semantics technique is based on identifying the one or more intent and dependent entities and association between them. In an embodiment, the FrameNet technique is based on a theory of the frame semantics. In the frame semantics technique, word meanings may be defined in relation to mapped frames. In an embodiment, each frame may comprise different frame elements such as, "agent", "experiencer", "Instrument" and the like. For instance, consider, the user utterance is, "I pulled the tray". Here, "I" plays the role of "Agent" and the "tray" is the "theme", which is the intent, and which is imposed by the verb "pull" in the current utterance. Hence, the presence of verb, "pull", restricts the intent determination module 219 to fit the utterance into pre-defined frames with selected frame element.

The polarity determination module 221 may determine the polarity of each of the one or more intent on the pre-defined scale. In an embodiment, the pre-defined scale comprises the left bound and the right bound. In an embodiment, the left bound is indicative of the negative polarity of the expected state of the one or more labels, and the right bound is indicative of the positive polarity of the expected state of the one or more labels. In an embodiment, the polarity determination module 221 may use textual entailment technique for determining the polarity of the one or more intent. A person skilled in the art would understand that any other technique for determining polarity, not mentioned explicitly, may also be used in the present disclosure. In an embodiment, the one or more frame elements may be enriched using type domain dependent polarity features such as "low", "high" etc., which align with positive and negative sentiment based on the features with which it is associated. For example, in the utterance, "the image quality is low", the "image quality" is the feature which is rated as "low" by the user, providing unsatisfactory remark. However, in the utterance, "The error rate is very low", the same polarity feature "low" results in "positive sentiment". In an embodiment, during training for each domain, <feature, polarity> strength of association is calculated based on proximity measure, which determines weights based on impact of negations and flow modifiers such as "but", "however", "though" etc., in the user utterance. In an embodiment, the user response may be directly provided using any of the dialog acts such as, "yes", "no" or "not clear" explicitly or may be expressed using implicit affirmative or negative response such as, "I have followed", "Its working" and the like. In an embodiment, the polarity determination module 221 may determine semantic relatedness measure between each of the frame features which may determine compatible dialog acts that may be the user utterance. For example, a dialog utterance such as, "ok" may be considered as "affirmative" in feedback queries but may be mapped as "listening/pondering" for other feature specific affirmative questions.

The polarity determination module 221 may extract polarity values for each expected state based on the pre-defined scale. In an embodiment, the left bound and the right bound of the pre-defined scale may be represented as, [−1, +1], where scores close to −1 refers to the left bound and score close to +1 refers to the right bound. For example, in a user utterance, "the images are blurred due to cartridge quality", the "cartridge" may be "empty"/"full". The empty state is negative triggering "new cartridge replacement" action. Similarly, "cartridge" is "full" indicates a positive state, and hence requires no further action by the user. In an embodiment, the utterance may be in dialog acts such as implicit and explicit. For example, the system utterance, "Are you able to open the tray", the user may give, for example, two set of explicit responses such as, "I am able to open the tray" which is an acknowledgement/positive response or "Tray is jammed" which is explicit negative response mentioning the tray state. Similarly, the implicit response in such case may be "Yes, there is no issue".

The user response generation module 223 may generate the one or more responses for the user. The user response generation module 223 may generate the one or more responses when the polarity determined for the one or more labels, bound by the relationship is within the pre-defined distance of the left bound or the right bound of the pre-defined scale. In an embodiment, the response for the user may comprise one or more clarification questions for the user. For example, if the system utterance is, "Have you pulled out the paper from tray and is the printer working fine", and the user utterance is supposing, "Printer is working fine". In this case, "Printer" is the "holonymy" of "Tray". Hence, the user utterance may be taken as positive response for both the labels and thus the system may be directed for generating next step of troubleshooting/feedback response such as, "Thanks for contacting the virtual Agent, do you need any other help?". In case, the user utterance is, "Paper is pulled out, but printer still has some issues". Here, the "Paper is pulled out" refers to positive state of tray, however, printer status is still negative. Thus, the user response generation module 223 may generate further troubleshooting questions related to other parts of the printer.

Figure 4:
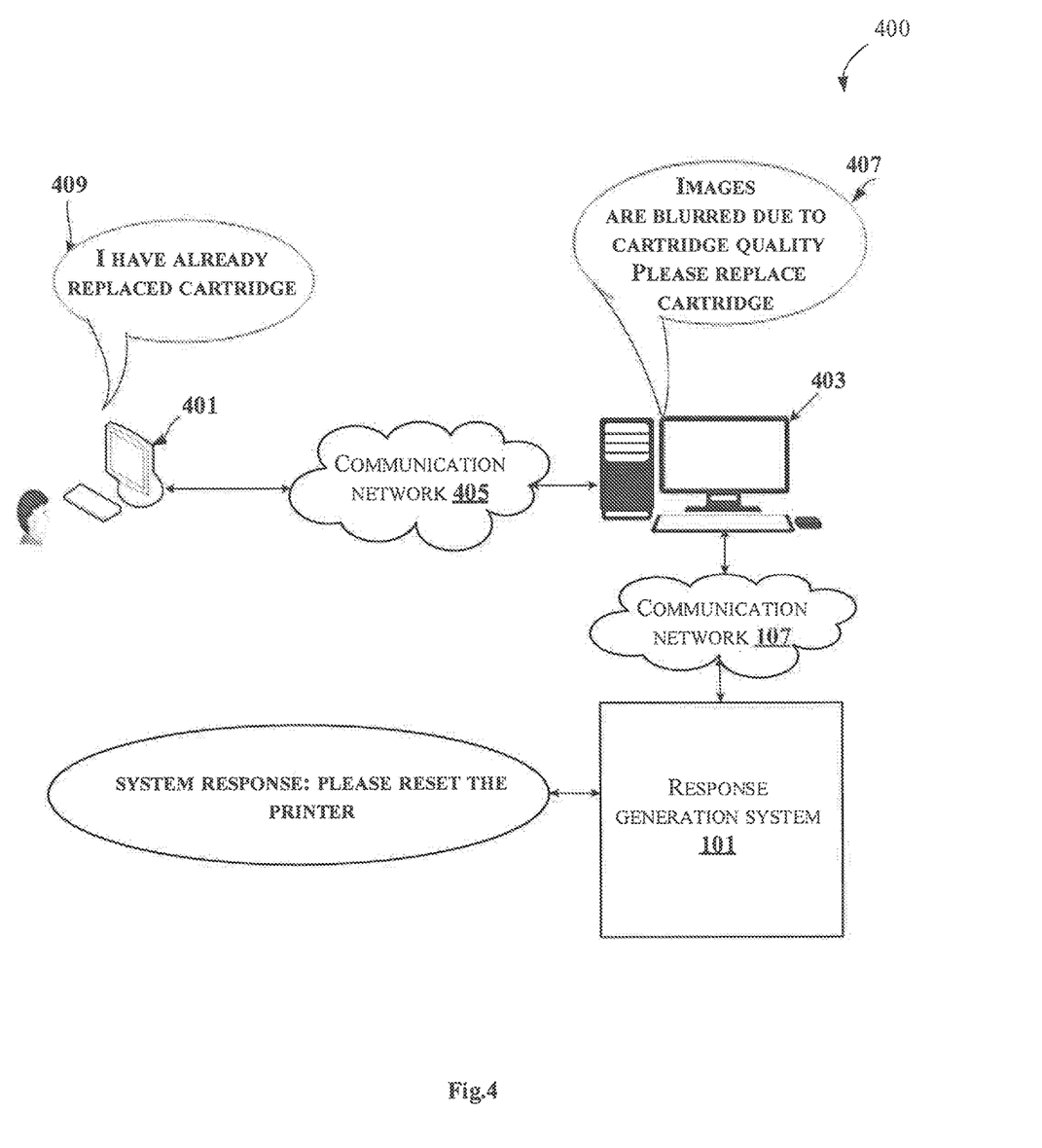
FIG. 4 show an exemplary representation for generating dialogue responses for a user in accordance with some embodiments of the present disclosure.

FIG. 4 show an exemplary representation for generating dialogue responses for a user in accordance with some embodiments of the present disclosure.

Referring now to FIG. 4, an exemplary representation 400 of generating dialogue responses is illustrated. The exemplary representation 400 comprises a user device 401 associated with a user connected through a communication network 405 to a virtual dialogue system 403. The virtual dialogue system 403 is connected through the communication network 107 to the response generation system 101. In an embodiment, the virtual dialogue system 403 may be one of the dialogue system of the plurality of dialogue systems 103 of the response generation system 101. A person skilled in the art would understand that FIG. 4 is an exemplary embodiment and the present disclosure may include plurality of dialogue systems 103. Consider, the user associated with the user device 401 may be facing a printer issue and queries a virtual agent, represented by the virtual dialogue system 403 for assistance. As shown in FIG. 4, the user device 401 and the virtual dialogue system 403 may be interacting regarding the printer issue. The virtual dialogue system 403 may provide a response for the query of the user as, "Images are blurred due to cartridge quality". The response from the virtual dialogue system 403 may be referred as system response 407. In view of the system response 407, the user device 401 may respond as, "I have already replaced the cartridge". The response from the user device 401 may be referred as user utterance 409. In such case, the response generation system 101 may receive the pair of utterance from the virtual dialogue system 403. In an embodiment, the pair of utterance comprises the one or more instructions and clarification questions from the dialogue system and corresponding response provided by the user. In the present case, the pair of utterance may be the system response 407 and the user utterance 409. The response generation system 101 may identify the one or more labels from the user utterance 409 of the pair of utterance based on the decision tree. In an embodiment, the decision tree comprises one or more nodes indicative of the label or the expected state of the label. In an embodiment, the response generation system 101 may identify the one or more labels from the plurality of predetermined labels stored in the database (not shown explicitly in FIG. 4). In the present case, the response generation system 101 may identify one label namely, "cartridge". In an embodiment, the one or more labels may exhibit the relationship, where the relationship may be semantic relationship such as, the holonymy relation and the meronymy relation. Further, the response generation system 101 may determine the one or more intent corresponding to the one or more labels. The response generation system 101 may determine the one or more intent by identifying one or more frames from the user utterance 409. In the present example, the response generation system 101 determines "blur" as the frame. In an embodiment, the frame "blur" may group verbs like "distort", "vague" etc. The response generation system 101 may identify the one or more pre-defined frame elements corresponding to each of the identified one or more frames. In the present example, "images" and "cartridge quality" may be identified as the frame elements for the frame "blur". The frame element "images" may plays a role of the "agent"/"topic" for the frame "blur". Further, the frame element "cartridge quality" may be identified as the frame element which may fall under "hardware_symptom" and describes the reason for blur.

Further, the response generation system 101 may determine the expected state information corresponding to the identified one or more frame elements. In an embodiment, the expected state information is indicative of the one or more intents of the user with respect to the identified one or more labels. In this case, the expected state information associated with the label "cartridge" may be "replace", which is a positive state for the respective label "cartridge". Further, the response generation system 101 may determine the polarity of the intent on the pre-defined scale and generate one or more responses for the user. The one or more responses for the user may be generated when the polarity for each of the labels from the identified one or more labels is within the pre-defined distance of the left bound or the right bound of the pre-defined scale. In the present example, the response generation system 101 may determine the polarity of the intent to be within the right bound. Hence, the response generation system 101 may generate a system response for the user device 401 as, "please reset the printer".

Figure 5:
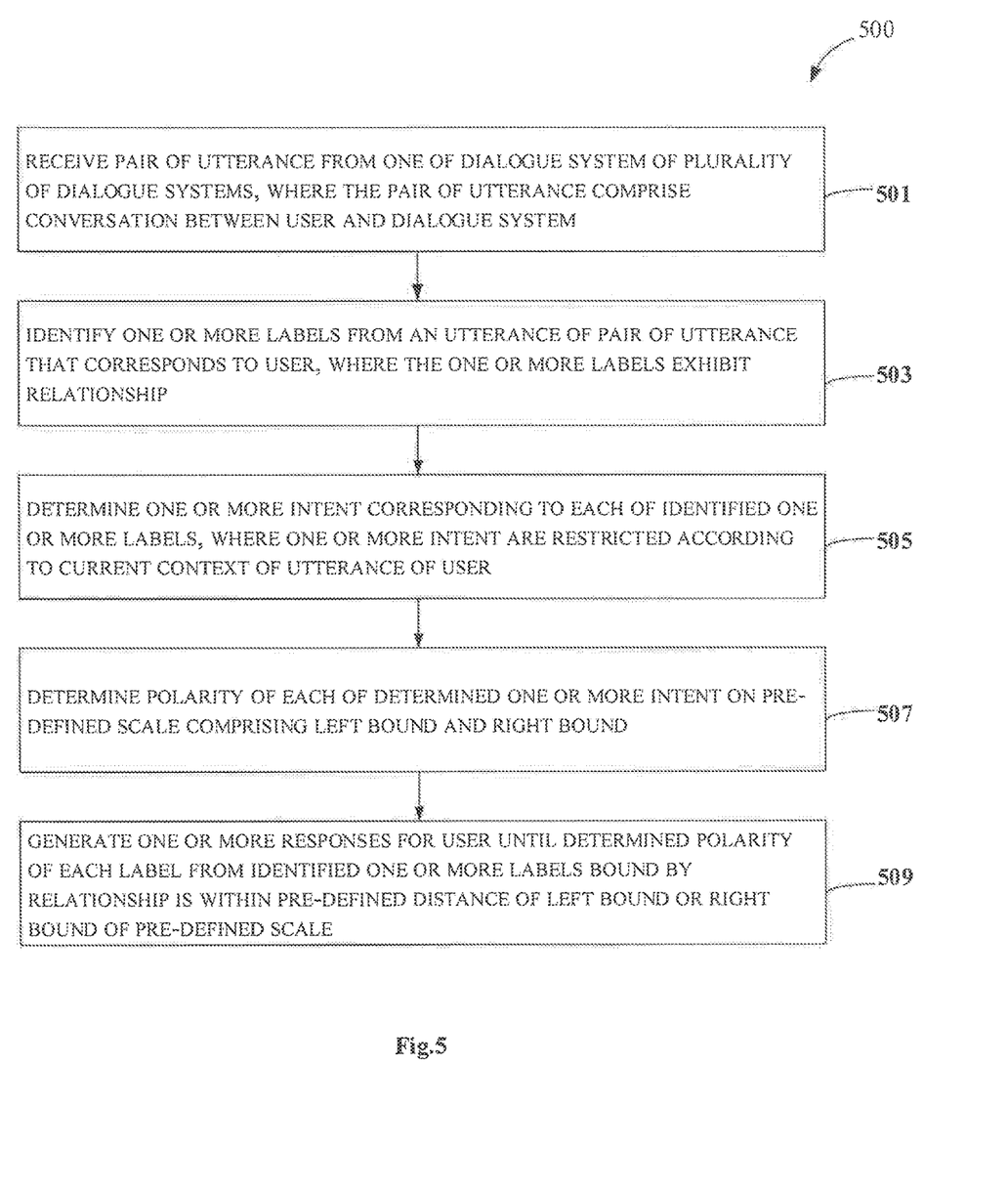
FIG. 5 illustrates a flowchart showing a method for generating dialogue responses for users in real-time in accordance with some embodiments of present disclosure.

FIG. 5 illustrates a flowchart showing a method for generating dialogue responses for users in real-time in accordance with some embodiments of present disclosure.

As illustrated in FIG. 5, the method 500 includes one or more blocks for generating dialogue responses for users in real-time. The method 500 may be described in the general context of computer executable instructions. Generally, computer executable instructions can include routines, programs, objects, components, data structures, procedures, modules, and functions, which perform particular functions or implement particular abstract data types.

The order in which the method 500 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 501, the pair of utterance is received, by the receiving module 215, from one of the dialogue system of the plurality of dialogue systems 103. The pair of utterance comprise conversation between the user and the dialogue system of the plurality of dialogue systems 103. In an embodiment, the pair of utterance comprises one or more instructions and clarification questions from the dialogue system of the plurality of dialogue systems 103 and corresponding response provided by the user.

At block 503, the one or more labels, may be identified by the label identification module 217, from the utterance of the pair of utterance that corresponds to the user. The one or more labels exhibit the semantic relationship. In an embodiment, the semantic relationship may be holonymy relation and the meronymy relation. In an embodiment, the one or more labels may be based on the decision tree which comprises the one or more nodes indicative of the label or the expected state of the label.

At block 505, the one or more intent corresponding to each of the identified one or more labels are determined, by the intent determination module 219. The one or more intent may be restricted according to the current context of the utterance of the user.

At block 507, the polarity of each of the one or more intent may be determined by the polarity determination module 221 based on the pre-defined scale which comprises the left bound and the right bound. In an embodiment, the left bound is indicative of negative polarity of the expected state of the one or more label, and the right bound is indicative of the positive polarity of the expected state of the one or more labels.

At block 509, the one or more responses for the user is generated by the response generation module 223 until the determined polarity for each of the labels, from the identified one or more labels, bound by the relationship, is within the pre-defined distance of the left bound or the right bound of the pre-defined scale. In an embodiment, the response for the user comprise one or more clarification questions for the user.

Figure 6:
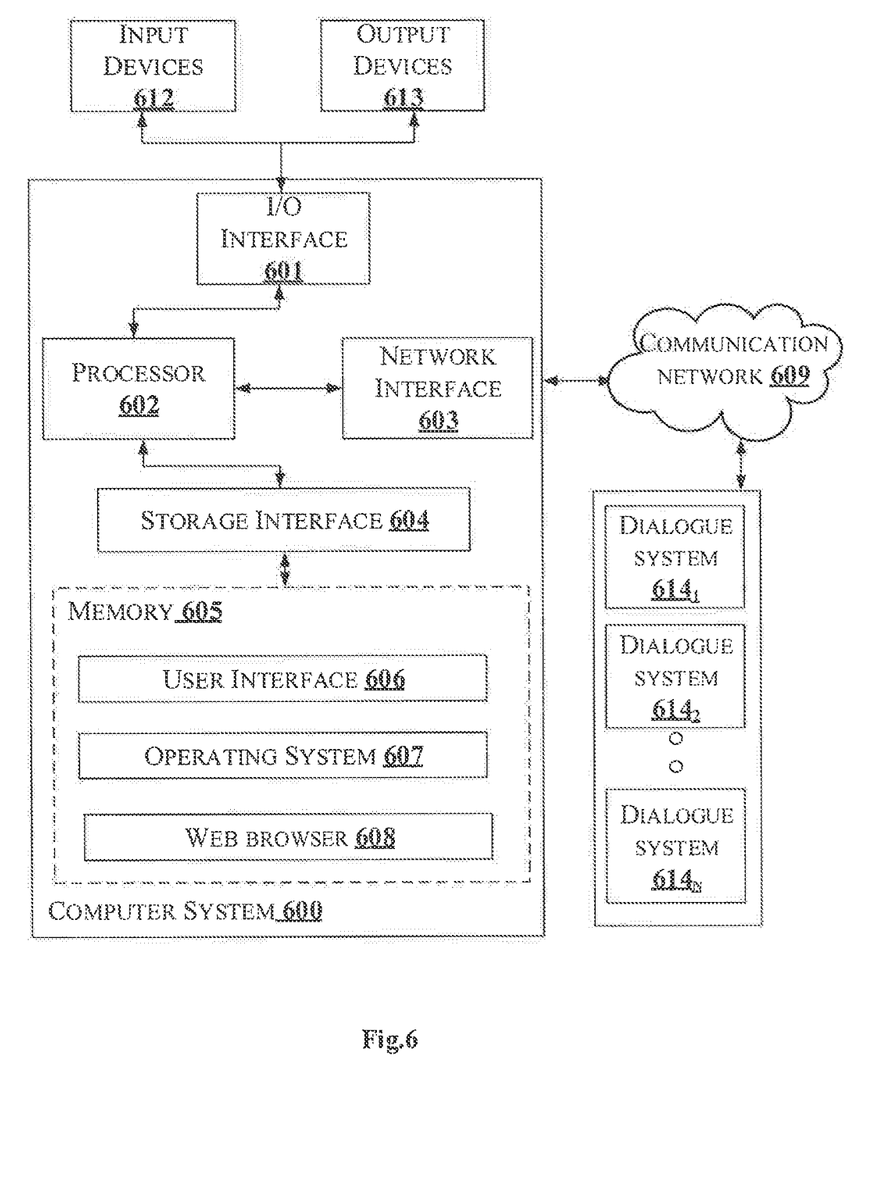
FIG. 6 illustrates a block diagram of an exemplary computer system for implementing embodiments consistent with the present disclosure.

FIG. 6 illustrates a block diagram of an exemplary computer system 600 for implementing embodiments consistent with the present disclosure. In an embodiment, the computer system 600 may be used to implement the response generation system 101. The computer system 600 may include a central processing unit ("CPU" or "processor") 602. The processor 602 may include at least one data processor for generating dialogue responses for users in real-time. The processor 602 may include specialized processing units such as, integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, IEEE®-1394, serial bus, universal serial bus (USB®), infrared, PS/2, BNC, coaxial, component, composite, digital visual interface (DVI), high-definition multimedia interface (HDMI®), RF antennas, S-Video, VGA, IEEE® 802.n/b/g/n/x, Bluetooth®, cellular (e.g., code-division multiple access (CDMA), high-speed packet access (HSPA+), global system for mobile communications (GSM™), long-term evolution (LTE™), WiMax™, or the like), etc.

Using the I/O interface 601, the computer system 600 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED™), plasma, Plasma display panel (PDP), Organic light-emitting diode display (OLED) or the like), audio speaker, etc.

In some embodiments, the computer system 600 consists of the response generation system 101. The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE® 802.11a/b/g/n/x, etc. The communication network 609 may include, without limitation, a direct interconnection, local area network (LAN), wide area network (WAN), wireless network (e.g., using Wireless Application Protocol), the Internet, etc. Using the network interface 603 and the communication network 609, the computer system 600 may communicate with a dialogue system $614_1$, a dialogue system $614_2$, . . . and a dialogue system $614_N$. The network interface 603 may employ connection protocols include, but not limited to, direct connect, Ethernet (e.g., twisted pair 10/100/1000 Base T), transmission control protocol/internet protocol (TCP/IP), token ring, IEEE® 802.11a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as, serial advanced technology attachment (SATA®), Integrated Drive Electronics (IDE), IEEE®-1394, Universal Serial Bus (USB®), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607 etc. In some embodiments, computer system 600 may store user/application data 606, such as, the data, variables, records, etc., as described in this disclosure. Such databases may be implemented as fault-tolerant, relational, scalable, secure databases such as Oracle or Sybase.

The operating system 607 may facilitate resource management and operation of the computer system 600. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 600 may implement a web browser 608 stored program component. The web browser 608 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX™, DHTML™, ADOBE® FLASH™, JAVASCRIPT™, JAVA™, Application Programming Interfaces (APIs), etc. In some embodiments, the computer system 600 may implement a mail server stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 600 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure resolves complex dialogue acts by generating responses for users in real-time.

An embodiment of the present disclosure reduces overall time in resolving issues of users in troubleshooting environment.

An embodiment of the present disclosure may skip one or more steps of troubleshooting steps, wherever needed.

An embodiment of the present disclosure triggers dynamic change in conversation flow based on labels detected.

An embodiment of the present disclosure handles variations in a way user describes issues or responses using domain specific frame elements.

An embodiment of the present disclosure handles complex utterances using domain specific frame semantic analysis.

An embodiment of the present disclosure detects implicit and explicit dialog act using selection restrictions to improve relevant feature association mapping.

An embodiment of the present disclosure triggers customized responses to user based on feature specific dialog act handling.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth®, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 3 and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Response generation system |
| 103 | Plurality of dialogue systems |
| 105 | Database |
| 107 | Communication network |
| 109 | I/O interface |
| 111 | Memory |
| 113 | Processor |
| 200 | Data |
| 201 | Utterance pair data |
| 203 | Label data |
| 205 | Intent related data |
| 207 | Polarity data |
| 209 | Response data |
| 211 | Other data |
| 213 | Modules |
| 215 | Receiving module |
| 217 | Label identification module |
| 219 | Intent determination module |

-continued

| Reference Number | Description |
| --- | --- |
| 221 | Polarity determination module |
| 223 | User response generation module |
| 225 | Other modules |
| 600 | Computer system |
| 601 | I/O interface |
| 602 | Processor |
| 603 | Network interface |
| 604 | Storage interface |
| 605 | Memory |
| 606 | User interface |
| 607 | Operating system |
| 608 | Web browser |
| 609 | Communication network |
| 612 | Input devices |
| 613 | Output devices |
| 614 | Plurality of dialogue systems |

What is claimed is:

1. A method of generating dialogue responses for users in real-time, the method comprising:
receiving, by a response generation system, a pair of utterance from a dialogue system of a plurality of dialogue systems, wherein the pair of utterance comprise conversation between a user and the dialogue system;
identifying, by the response generation system, one or more labels from an utterance of the pair of utterance that corresponds to the user, wherein the one or more labels exhibit a relationship;
determining, by the response generation system, one or more intents corresponding to each of the identified one or more labels, wherein the one or more intents are restricted according to a current context of the utterance of the user;
determining, by the response generation system, a polarity of each of the determined one or more intents on a pre-defined scale comprising a left bound and a right bound; and
generating, by the response generation system, one or more responses for the user until the determined polarity for each of the labels, from the identified one or more labels, bound by the relationship, is within a pre-defined distance of the left bound or the right bound of the pre-defined scale.

2. The method as claimed in claim 1, wherein the pair of utterance comprises one or more instructions and clarification questions from the computing device and corresponding response provided by the user.

3. The method of claim 1, wherein the identification of the one or more labels is based on a decision tree comprising one or more nodes indicative of a label or an expected state of the label.

4. The method of claim 1, wherein the determination of the one or more intents is based on:
identifying one or more frames from the utterance of the user, wherein each of the one or more frames correspond to the identified one or more labels;
identifying one or more pre-defined frame elements corresponding to each of the identified one or more frames, wherein each frame element is pre-annotated with a pre-defined set of frames specific to a domain;
determining an expected state information corresponding to each of the identified one or more frame elements, wherein the expected state information is indicative of the one or more intents of the user with respect to the identified one or more labels.

5. The method of claim 4, wherein the pre-annotation of the one or more frame elements is performed based on:
enriching each frame element of the one or more frame elements based on manual inputs received from a user; and
determining prominent frame elements characterizing the domain based on a spectral clustering and a re-ranking of each frame element.

6. The method as claimed in claim 1, wherein the response for the user comprise one or more clarification questions for the user.

7. The method as claimed in claim 1, wherein each of the one or more labels corresponds to a label from a plurality of predetermined labels stored in a database.

8. The method of claim 1, wherein the left bound is indicative of negative polarity of an expected state of the identified one or more label, and the right bound is indicative of a positive polarity of the expected state of the identified one or more labels.

9. A response generation system for generating dialogue responses for users in real-time, comprising:
a processor; and
a memory communicatively coupled to the processor, wherein the memory stores processor instructions, which, on execution, causes the processor to:
receive a pair of utterance from a dialogue system of a plurality of dialogue systems, wherein the pair of utterance comprise conversation between a user and the dialogue system;
identify one or more labels from an utterance of the pair of utterance that corresponds to the user, wherein the one or more labels exhibit a relationship;
determine one or more intents corresponding to each of the identified one or more labels, wherein the one or more intents are restricted according to a current context of the utterance of the user;
determine a polarity of each of the determined one or more intents on a pre-defined scale comprising a left bound and a right bound; and
generate one or more responses for the user until the determined polarity for each of the labels, from the identified one or more labels, bound by the relationship, is within a pre-defined distance of the left bound or the right bound of the pre-defined scale.

10. The response generation system as claimed in claim 9, wherein the pair of utterance comprises one or more instructions and clarification questions from the computing device and corresponding response provided by the user.

11. The response generation system of claim 9, wherein the identification of the one or more labels is based on a decision tree comprising one or more nodes indicative of a label or an expected state of the label.

12. The response generation system of claim 9, wherein the determination of the one or more intents is based on:
identifying one or more frames from the utterance of the user, wherein each of the one or more frames correspond to the identified one or more labels;
identifying one or more pre-defined frame elements corresponding to each of the identified one or more frames, wherein each frame element is pre-annotated with a pre-defined set of frames specific to a domain;
determining an expected state information corresponding to each of the identified one or more frame elements, wherein the expected state information is indicative of the one or more intents of the user with respect to the identified one or more labels.

13. The response generation system of claim 12, wherein the pre-annotation of the one or more frame elements is performed based on:
enriching each frame element of the one or more frame elements based on manual inputs received from a user; and
determining prominent frame elements characterizing the domain based on a spectral clustering and a re-ranking of each frame element.

14. The response generation system as claimed in claim 9, wherein the response for the user comprise one or more clarification questions for the user.

15. The response generation system as claimed in claim 9, wherein each of the one or more labels corresponds to a label from a plurality of predetermined labels stored in a database.

16. The response generation system of claim 9, wherein the left bound is indicative of negative polarity of an expected state of the identified one or more label, and the right bound is indicative of a positive polarity of the expected state of the identified one or more labels.

17. A non-transitory computer readable medium including instructions for generating dialogue responses for users in real-time stored thereon that when processed by at least one processor cause a response generation system perform operation comprising:
receiving a pair of utterance from a dialogue system of a plurality of dialogue systems, wherein the pair of utterance comprise conversation between a user and the dialogue system;
identifying one or more labels from an utterance of the pair of utterance that corresponds to the user, wherein the one or more labels exhibit a relationship;
determining one or more intents corresponding to each of the identified one or more labels, wherein the one or more intents are restricted according to a current context of the utterance of the user;
determining a polarity of each of the determined one or more intents on a pre-defined scale comprising a left bound and a right bound; and
generating one or more responses for the user until the determined polarity for each of the labels, from the identified one or more labels, bound by the relationship, is within a pre-defined distance of the left bound or the right bound of the pre-defined scale.

18. The medium as claimed in claim 17, wherein the pair of utterance comprises one or more instructions and clarification questions from the computing device and corresponding response provided by the user.

19. The medium as claimed in claim 17, wherein the instruction causes the processor to identify the one or more labels based on a decision tree comprising one or more nodes indicative of a label or an expected state of the label.

20. The medium as claimed in claim 17, wherein the instruction causes the processor to determine the one or more intents by:
identifying one or more frames from the utterance of the user, wherein each of the one or more frames correspond to the identified one or more labels;
identifying one or more pre-defined frame elements corresponding to each of the identified one or more frames, wherein each frame element is pre-annotated with a pre-defined set of frames specific to a domain;
determining an expected state information corresponding to each of the identified one or more frame elements, wherein the expected state information is indicative of the one or more intents of the user with respect to the identified one or more labels.

\* \* \* \* \*